(12) United States Patent
Yim et al.

(10) Patent No.: US 11,626,058 B2
(45) Date of Patent: Apr. 11, 2023

(54) DISPLAY APPARATUS AND METHOD OF DRIVING THE SAME

(71) Applicant: Samsung Display Co., Ltd., Yongin-Si (KR)

(72) Inventors: Dale Yim, Yongin-si (KR); Nam-Gon Choi, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/325,725

(22) Filed: May 20, 2021

(65) Prior Publication Data

US 2022/0076606 A1 Mar. 10, 2022

(30) Foreign Application Priority Data

Sep. 9, 2020 (KR) .......................... 10-2020-0115304

(51) Int. Cl.
*G09G 3/20* (2006.01)
*G06V 10/50* (2022.01)

(52) U.S. Cl.
CPC ......... *G09G 3/2007* (2013.01); *G06V 10/507* (2022.01); *G09G 3/2003* (2013.01); *G09G 2310/027* (2013.01); *G09G 2310/0297* (2013.01); *G09G 2320/066* (2013.01); *G09G 2320/0666* (2013.01)

(58) Field of Classification Search
CPC ............... G09G 3/2007; G09G 3/2003; G09G 2310/027; G09G 2310/0297; G09G 2320/066; G09G 2320/0666; G09G 2320/0271; G09G 2330/021; G09G 2340/0435; G09G 2360/10; G06V 10/507
See application file for complete search history.

(56) References Cited

U.S. PATENT DOCUMENTS

| | | | | |
|---|---|---|---|---|
| 6,049,324 A * | 4/2000 | Palalau | .................... | G09G 3/30 345/589 |
| 6,900,820 B2 * | 5/2005 | Kataoka | ............... | G09G 3/3406 315/86 |
| 7,394,448 B2 * | 7/2008 | Park | .................... | G09G 3/3406 345/89 |
| 8,031,166 B2 * | 10/2011 | Qiao | .................... | G09G 3/3426 345/102 |
| 8,334,931 B2 * | 12/2012 | Nishio | ................... | H04N 5/147 348/674 |

(Continued)

FOREIGN PATENT DOCUMENTS

KR 10-2019-0073633 A 6/2019

*Primary Examiner* — Michael J Jansen, II
(74) *Attorney, Agent, or Firm* — Innovation Counsel LLP

(57) ABSTRACT

A display apparatus includes a display panel, a contrast analyzer, a contrast processor and a data driver. The display panel includes a plurality of sub display areas. The display panel is configured to display an image based on input image data. The contrast analyzer is configured to analyze the input image data in a time division method. The contrast processor is configured to adjust contrast of the input image data based on analysis result of the contrast analyzer. The data driver is configured to generate data voltages based on output data of the contrast processor. A number of contrast analysis cores of the contrast analyzer is determined according to a number of the sub display areas and a frame rate.

18 Claims, 15 Drawing Sheets

(56) References Cited

U.S. PATENT DOCUMENTS

| | | | | |
|---|---|---|---|---|
| 8,558,772 B2* | 10/2013 | Yamagishi | ............... | G09G 3/20 |
| | | | | 345/89 |
| 8,654,260 B2* | 2/2014 | Nishio | ................... | H04N 5/202 |
| | | | | 348/674 |
| 9,196,189 B2* | 11/2015 | Gandhi | ................ | G09G 3/2029 |
| 10,339,848 B2* | 7/2019 | Park | .................... | G09G 3/2007 |
| 2002/0021275 A1* | 2/2002 | Kataoka | .............. | G09G 3/3648 |
| | | | | 345/102 |
| 2004/0257329 A1* | 12/2004 | Park | ....................... | G09G 3/342 |
| | | | | 345/102 |
| 2007/0159488 A1* | 7/2007 | Danskin | ................ | G09G 5/393 |
| | | | | 345/505 |
| 2008/0030450 A1* | 2/2008 | Yamagishi | ............... | G09G 3/20 |
| | | | | 345/89 |
| 2009/0115718 A1* | 5/2009 | Qiao | ................... | G09G 3/3611 |
| | | | | 345/102 |
| 2009/0141176 A1* | 6/2009 | Tomisaka | ............ | G09G 3/2007 |
| | | | | 348/671 |
| 2010/0271553 A1* | 10/2010 | Nishio | ................... | H04N 5/147 |
| | | | | 348/687 |
| 2011/0254850 A1* | 10/2011 | Kikuta | ................ | G09G 3/3225 |
| | | | | 345/520 |
| 2012/0287144 A1* | 11/2012 | Gandhi | ............... | G09G 3/3413 |
| | | | | 345/589 |
| 2013/0063666 A1* | 3/2013 | Nishio | ................... | H04N 5/147 |
| | | | | 348/607 |
| 2015/0365621 A1* | 12/2015 | Zhang | ................... | G09G 5/005 |
| | | | | 348/791 |
| 2016/0351103 A1* | 12/2016 | Park | ..................... | G09G 3/2007 |
| 2021/0350755 A1* | 11/2021 | Yamagishi | ........... | G09G 3/3426 |

* cited by examiner

FIG. 17
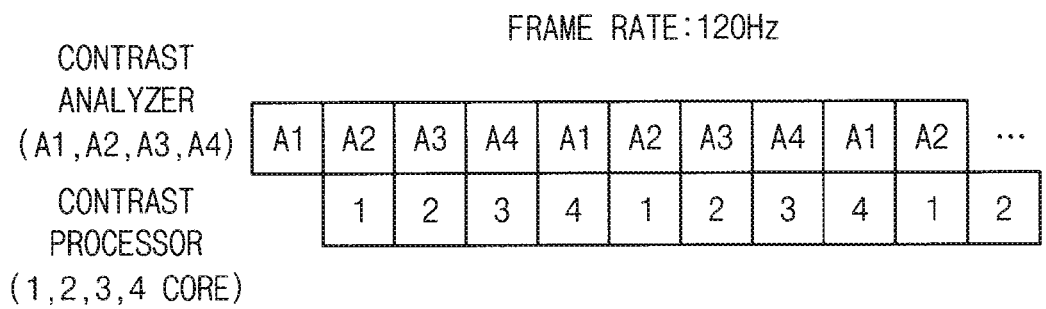
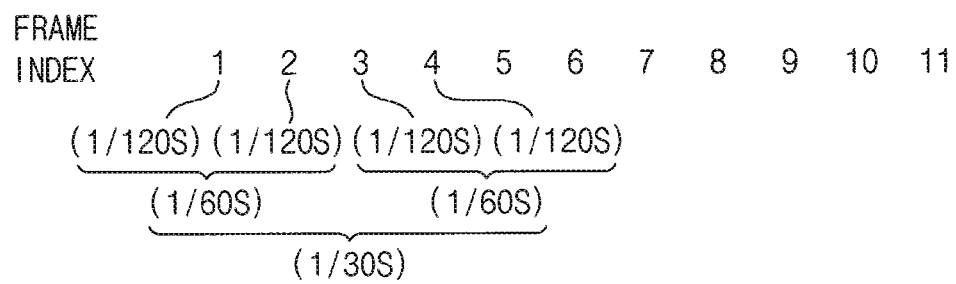
FIG. 18
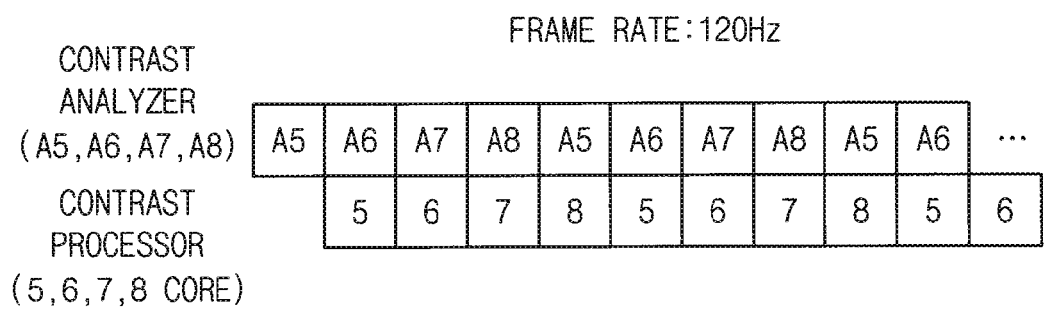
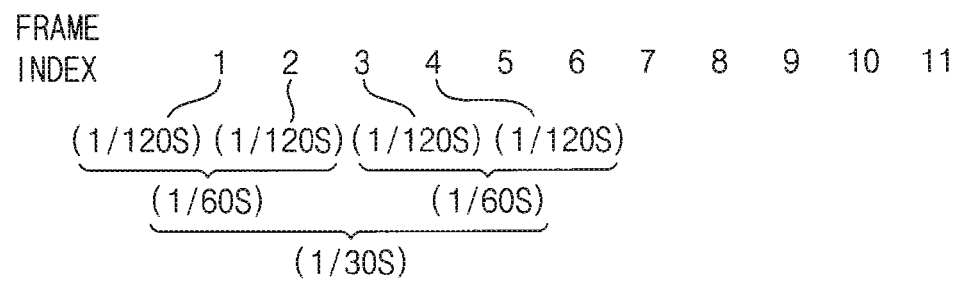

FIG. 23

| NUMBER OF SUB DISPLAY AREAS | FRAME RATE(Hz) | NUMBER OF CONTRAST ANALYSIS CORES |
|---|---|---|
| 2 | 60 | 1(1/2) |
| 4 | 60 | 2(1/2) |
| 8 | 60 | 4(1/2) |
| 16 | 60 | 8(1/2) |

FIG. 24

| NUMBER OF SUB DISPLAY AREAS | FRAME RATE(Hz) | NUMBER OF CONTRAST ANALYSIS CORES |
|---|---|---|
| 2 | 60 | 1(1/2) |
| 4 | 60 | 2(1/2) |
| 8 | 120 | 2(1/4) |
| 16 | 240 | 2(1/8) |

DISPLAY APPARATUS AND METHOD OF DRIVING THE SAME

PRIORITY STATEMENT

This application claims priority under 35 U.S.C. § 119 to Korean Patent Application No. 10-2020-0115304, filed on Sep. 9, 2020 in the Korean Intellectual Property Office KIPO, the contents of which are herein incorporated by reference in their entireties.

BACKGROUND

1. Field

Embodiments of the present inventive concept relate to a display apparatus and a method of driving the display apparatus. More particularly, embodiments of the present inventive concept relate to a display apparatus operating contrast analysis cores in a time division method to reduce the number of the contrast analysis cores and a method of driving the display apparatus.

2. Description of the Related Art

A display apparatus may include a flexible display panel. A foldable display apparatus, a rollable display apparatus, a bended display apparatus and a slide display apparatus may be implemented using the flexible display panel.

Generally, the display apparatus includes a display panel and a display panel driver. The display panel includes a plurality of gate lines and a plurality of data lines. The display panel driver includes a gate driver, a data driver and a driving controller. The gate driver outputs gate signals to the gate lines. The data driver outputs data voltages to the data lines. The driving controller controls the gate driver and the data driver.

The driving controller may include a contrast compensator to enhance a contrast of an image. The display apparatus including the flexible display panel may include a plurality of sub display areas. To compensate the contrast for each of the sub display areas, the number of cores of the contrast compensator may increase so that a size of the display panel driver may increase and a power consumption of the display apparatus may increase.

SUMMARY

Embodiments of the present inventive concept provide a display apparatus operating contrast analysis cores in a time division method to reduce a size of a display panel driver and a power consumption of the display apparatus.

Embodiments of the present inventive concept also provide a method of driving the display apparatus.

In an embodiment of a display apparatus according to the present inventive concept, the display apparatus includes a display panel, a contrast analyzer, a contrast processor and a data driver. The display panel includes a plurality of sub display areas. The display panel is configured to display an image based on input image data. The contrast analyzer is configured to analyze the input image data in a time division method. The contrast processor is configured to adjust contrast of the input image data based on analysis result of the contrast analyzer. The data driver is configured to generate data voltages based on output data of the contrast processor. A number of contrast analysis cores of the contrast analyzer is determined according to a number of the sub display areas and a frame rate.

In an embodiment, as the number of the sub display areas increases, the number of the contrast analysis cores may be increased.

In an embodiment, as the frame rate increases, the number of the contrast analysis cores may decrease.

In an embodiment, a number of contrast processor cores of the contrast processor may be equal to the number of the sub display areas.

In an embodiment, the number of the contrast analysis cores may be less than the number of the contrast processor cores.

In an embodiment, the display apparatus may further include a switch connecting one contrast analysis core to a plurality of the contrast processor cores.

In an embodiment, the display apparatus may further include a multiplexer configured to selectively output one of outputs of the plurality of the contrast processor cores.

In an embodiment, when the number of the sub display areas is two and the frame rate is 60 Hz, the number of the contrast analysis core may be one and the number of the contrast processor cores may be two.

In an embodiment, when the number of the sub display areas is four and the frame rate is 60 Hz, the number of the contrast analysis cores may be two and the number of the contrast processor cores may be four.

In an embodiment, when the number of the sub display areas is four and the frame rate is 120 Hz, the number of the contrast analysis core may be one and the number of the contrast processor cores may be four.

In an embodiment, when the number of the sub display areas is eight and the frame rate is 120 Hz, the number of the contrast analysis cores may be two and the number of the contrast processor cores may be eight.

In an embodiment, when the number of the sub display areas is sixteen and the frame rate is 240 Hz, the number of the contrast analysis cores may be two and the number of the contrast processor cores may be sixteen.

In an embodiment, the contrast analyzer may be configured to convert first color coordinates of the input image data to second color coordinates to extract luminance components of the input image data, to generate a luminance histogram based on the luminance components of the input image data, to generate a low luminance group, a medium luminance group and a high luminance group based on the luminance histogram and to determine a first threshold value between the low luminance group and the medium luminance group and a second threshold value between the medium luminance group and the high luminance group.

In an embodiment, the first threshold value and the second threshold value may be updated for each frame.

In an embodiment, when grayscale data included in the medium luminance group is greater than a reference value, the contrast processor may be configured to compensate the input image data to increase the contrast of the input image data. When the grayscale data included in the medium luminance group is less than the reference value, the contrast processor may be configured to compensate the input image data to decrease the contrast of the input image data.

In an embodiment of a method of driving a display apparatus according to the present inventive concept, the method includes analyzing input image data applied to a display panel that includes a plurality of sub display areas in a time division method, adjusting contrast of the input image data based on an analysis result of the input image data and generating data voltages based on image data having the adjusted contrast. A number of contrast analysis cores which analyze the input image data is determined according to a number of the sub display areas and a frame rate.

In an embodiment, as the number of the sub display areas increases, the number of the contrast analysis cores may increase.

In an embodiment, as the frame rate increases, the number of the contrast analysis cores may decrease.

In an embodiment, the analyzing input image data may include converting first color coordinates of the input image data to second color coordinates to extract luminance components of the input image data, generating a luminance histogram based on the luminance components of the input image data, generating a low luminance group, a medium luminance group and a high luminance group based on the luminance histogram and determining a first threshold value between the low luminance group and the medium luminance group and a second threshold value between the medium luminance group and the high luminance group.

In an embodiment, when grayscale data included in the medium luminance group is greater than a reference value, the input image data may be compensated to increase the contrast of the input image data. When the grayscale data included in the medium luminance group is less than the reference value, the input image data may be compensated to decrease the contrast of the input image data.

According to the display apparatus and the method of driving the display apparatus, in the display apparatus including the display panel including the plurality of sub display areas, the contrast analysis cores may be operated in a time division method so that the number of the contrast analysis cores may be reduced.

The number of the contrast analysis cores is reduced so that the size of the display panel driver may be reduced and the power consumption of the display apparatus may be reduced.

BRIEF DESCRIPTION OF THE DRAWINGS

The above and other features and advantages of the present inventive concept will become more apparent by describing in detailed embodiments thereof with reference to the accompanying drawings, in which:

FIGS. 17 and 18 are conceptual diagrams illustrating a contrast analyzer and a contrast processor for the display panel of FIG. 16;

FIG. 23 is a table illustrating the number of contrast analysis cores according to the number of the sub display areas of the display panel of FIG. 1 and a frame rate; and FIG. 24 is a table illustrating the number of contrast analysis cores according to the number of the sub display areas of the display panel of FIG. 1 and the frame rate.

DETAILED DESCRIPTION OF THE INVENTIVE CONCEPT

Hereinafter, the present inventive concept will be explained in detail with reference to the accompanying drawings.

Figure 1:
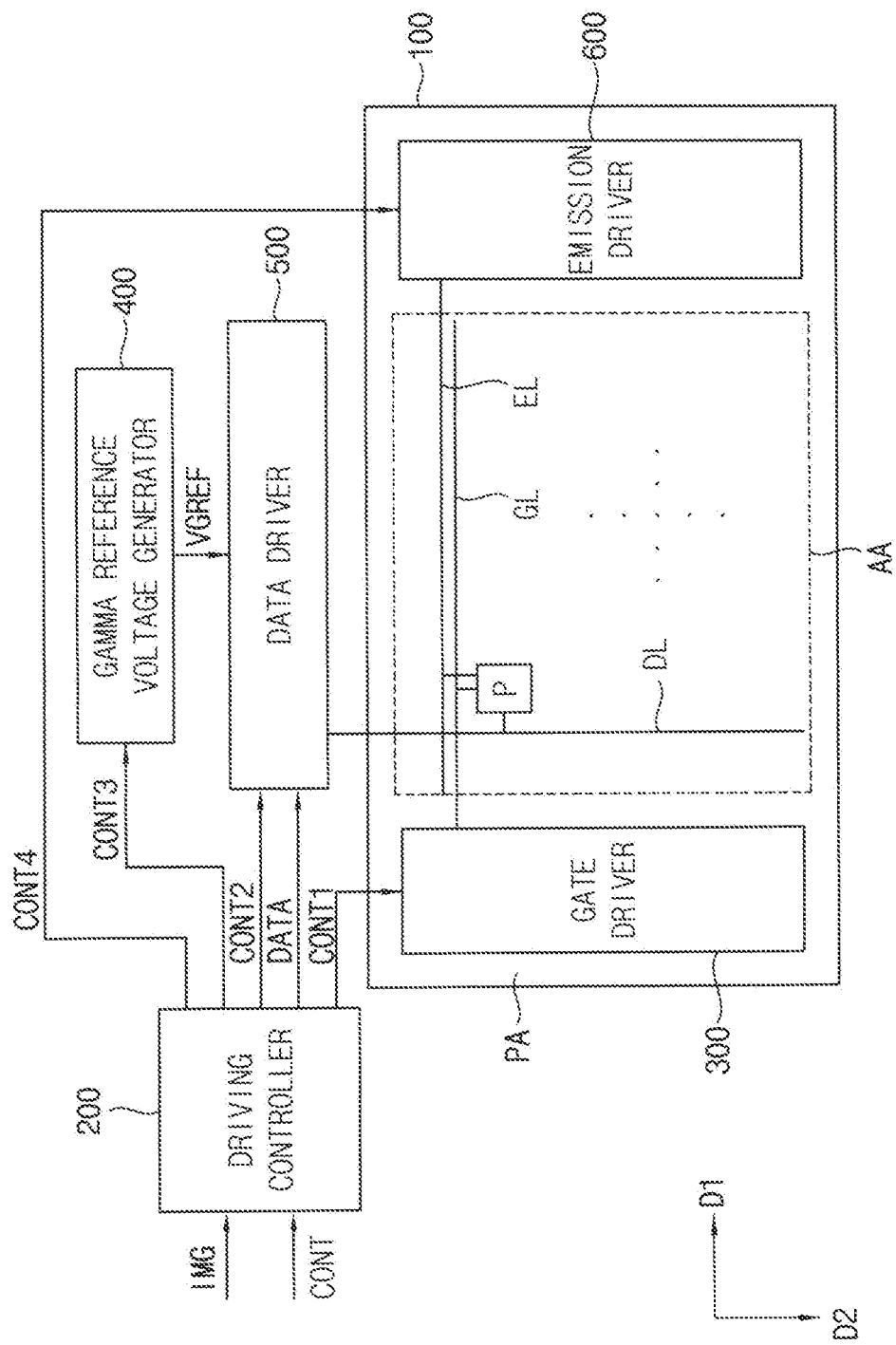
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400 and a data driver 500. The display panel driver may further include an emission driver 600.

The driving controller 200 and the data driver 500 may be embedded into one integrated circuit IC chip. For example, the driving controller 200, the gamma reference voltage generator 400 and the data driver 500 may be embedded into one integrated circuit IC chip. A driving module including at least the driving controller 200 and the data driver 500 which are embedded into one integrated circuit IC chip may be called a timing controller embedded data driver (TED).

The display panel 100 has a display region AA on which an image is displayed and a peripheral region PA adjacent to the display region AA.

The display panel 100 includes a plurality of gate lines GL, a plurality of data lines DL and a plurality of pixels connected to the gate lines GL and the data lines DL. The gate lines GL extend in a first direction D1 and the data lines DL extend in a second direction D2 crossing the first direction D1.

The display panel 100 may include a plurality of areas. The plurality of areas may include a sub display area and a sub off area. Input image data may be provided to the corresponding sub display area. In contrast, the input image data may not be provided to the sub off area. The display panel 100 may be a flexible display panel. For example, the display apparatus may be a foldable display apparatus. For example, the display apparatus may be a rollable display apparatus. The display apparatus may be a bendable display apparatus. The display apparatus may be a curved display apparatus. The display apparatus may be a slide display apparatus.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL.

In an embodiment, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200 or in the data driver 500.

The data driver 500 receives the second control signal CONT2 and the data signal DATA from the driving controller 200 and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 may generate emission signals to drive emission lines EL. The emission driver 600 may output the emission signals to the emission lines EL. For example, the emission driver 600 may be integrated on the display panel 100. For example, the emission driver 600 may be mounted on the display panel 100. Although the gate driver 300 applies the gate signal to the pixels P from a first side of the display panel 100 and the emission driver 600 applies the emission signal to the pixels P from a second side of the display panel 100 in FIG. 1, the present inventive concept may not be limited thereto. Alternatively, the gate driver 300 and the emission driver 600 may apply the gate signal and the emission signal to the pixels P from the first side of the display panel 100. Alternatively, the gate driver 300 and the emission driver 600 may apply the gate signal and the emission signal to the pixels P from both sides of the display panel 100.

Figure 2:
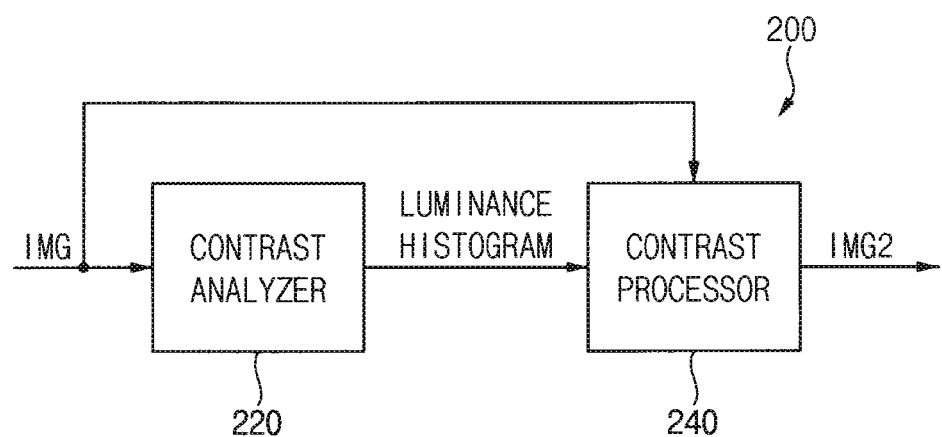
FIG. 2 is a block diagram illustrating a driving controller of FIG. 1.
Figure 3:
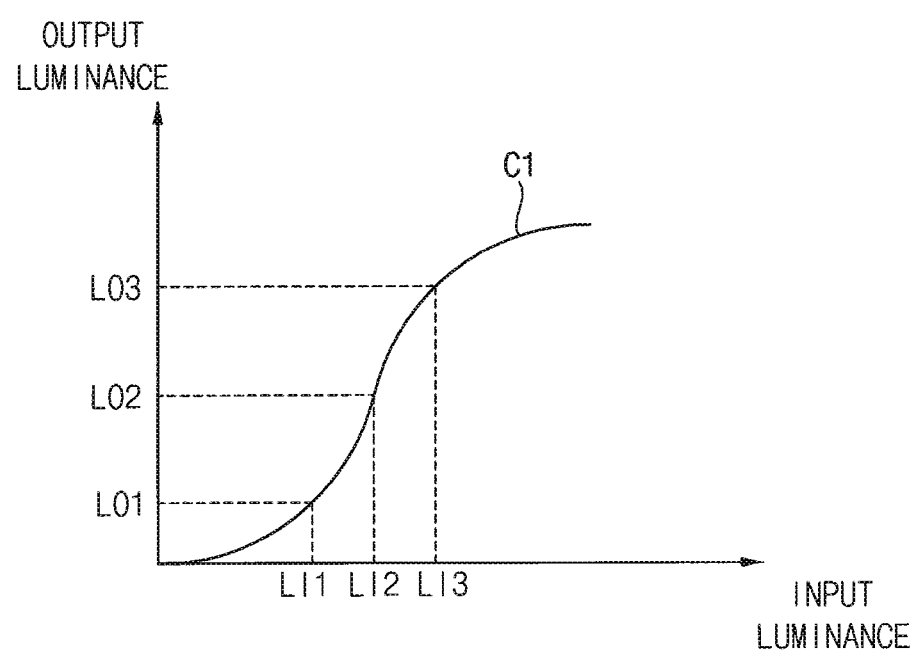
FIGS. 3 and 4 are graphs illustrating an operation of a contrast processor of FIG. 2.
Figure 4:
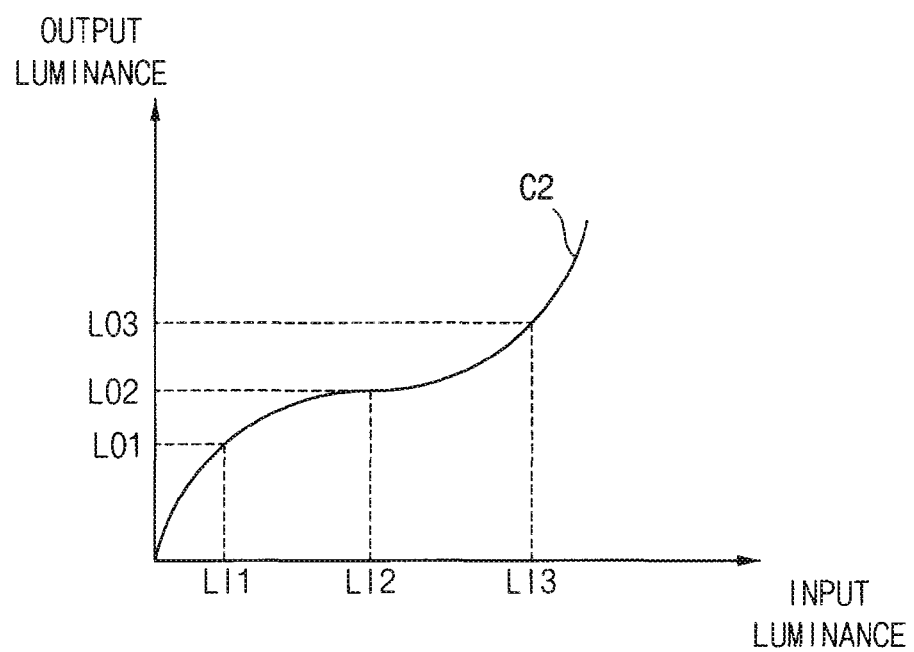

FIG. 2 is a block diagram illustrating the driving controller 200 of FIG. 1. FIGS. 3 and 4 are graphs illustrating an operation of a contrast processor 240 of FIG. 2.

Referring to FIGS. 1 to 4, the driving controller 200 may include a contrast analyzer 220 and the contrast processor 240. When the driving controller 200 is integrally formed with the data driver 500, the contrast analyzer 220 and the contrast processor 240 may be also integrally formed with the data driver 500.

The contrast analyzer 220 may analyze the input image data IMG in a time division method. For example, the contrast analyzer 220 may analyze input image data corresponding to a first sub display area of the display panel 100 in a first frame and may analyze input image data corresponding to a second sub display area of the display panel 100 in a second frame.

The contrast processor 240 may adjust a contrast of the input image data IMG based on an analysis result of the contrast analyzer 220. Output image data IMG2 of the contrast processor 240 may be image data having an adjusted contrast from the input image data IMG.

The data driver 500 may generate the data voltage based on the output image data IMG2 of the contrast processor 240.

The contrast analyzer 220 may convert a first color coordinate of the input image data IMG to a second color coordinate to extract a luminance component of the input image data IMG. The contrast analyzer 220 may generate a luminance histogram based on the luminance component of the input image data IMG. The contrast analyzer 220 may generate a low luminance group, a medium luminance group and a high luminance group based on the luminance histogram and may determine a first threshold value between the low luminance group and the medium luminance group and a second threshold value between the medium luminance group and the high luminance group.

For example, the first color coordinate may be RGB color coordinate. The second color coordinate may be YCbCr color coordinate. The contrast analyzer 220 may extract the color component (Y component) of the input image data IMG which are converted into YCbCr color coordinate. The contrast analyzer 220 may generate the low luminance group, the medium luminance group and the high luminance group by arranging the luminance component (Y component) of all image data in a frame of the input image data IMG. The contrast analyzer 220 may generate the low luminance group, the medium luminance group and the high luminance group for each frame.

The first threshold value and the second threshold value may be updated for each frame according to an analysis result of a previous frame. For example, the first threshold value and the second threshold value of a present frame may be determined based on an analysis result of an immediately previous frame of the present frame. Alternatively, the first threshold value and the second threshold value of a present frame may be determined by accumulating analysis results of previous frames of the present frame.

When grayscale data included in the medium luminance group is greater than a reference value, the contrast processor 240 may compensate the input image data IMG to increase the contrast of the input image data IMG. When grayscale data included in the medium luminance group is less than the reference value, the contrast processor 240 may compensate the input image data IMG to decrease the contrast of the input image data IMG.

For example, when the input image data IMG represent a landscape in a cloudy weather, the grayscale data included in the medium luminance group may be greater than the reference value. In this case, the image quality of the input image data IMG may be improved like a landscape in a clear weather by increasing the contrast of the input image data IMG.

For example, when gray scale data included in the medium luminance group is less than the reference value, the input image data may mainly have the high luminance group, may mainly have the low luminance group, or may mainly have both the high luminance group and the low luminance group. In this case, when the contrast of the input image data IMG is decreased, the image quality may be enhanced.

FIG. 3 illustrates a case of increasing the contrast of the input image data IMG using a first curve C1 having an S-shape. An interval between first, second and third output luminances LO1, LO2, and LO3 is greater than an interval between first, second, and third input luminances LI1, LI2, and LI3 in FIG. 3 so that the contrast of the output image data IMG2 may increase compared to the contrast of the input image data IMG.

FIG. 4 illustrates a case of decreasing the contrast of the input image data IMG using a second curve C2 having an inverse S-shape. The interval between first, second and third output luminances LO1, LO2, and LO3 is less than the interval between first, second, and third input luminances LI1, LI2, and LI3 in FIG. 4 so that the contrast of the output image data IMG2 may decrease compared to the contrast of the input image data IMG.

Figure 5:
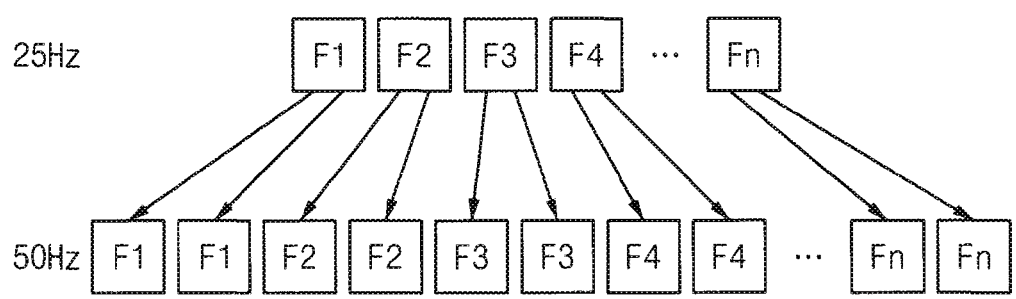
FIG. 5 is a conceptual diagram illustrating examples of input image data and source image data when a frame rate of the display apparatus of FIG. 1 is 50 Hz.
Figure 6:
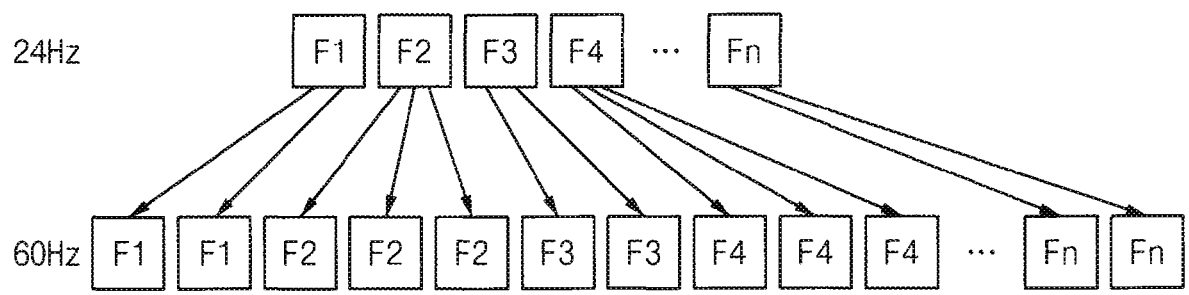
FIG. 6 is a conceptual diagram illustrating examples of input image data and source image data when a frame rate of the display apparatus of FIG. 1 is 60 Hz.

FIG. 5 is a conceptual diagram illustrating examples of input image data and source image data when a frame rate of the display apparatus of FIG. 1 is 50 Hz. FIG. 6 is a conceptual diagram illustrating examples of input image data and source image data when a frame rate of the display apparatus of FIG. 1 is 60 Hz.

Referring to FIG. 5, the source image data may have a frame rate of 25 Hz and the input image data of the display apparatus may have a frame rate of 50 Hz. The frame rate of the display apparatus is 50 Hz so that a host may convert the frame rate of the source image data of 25 Hz to 50 Hz to provide the input image data having the frame rate of 50 Hz to the driving controller 200 of the display apparatus. Each of frame images of the source image data may be copied to form two consecutive identical frame images. For example, a first frame image F1 and a second frame image F2 of the source image data is copied by two to form first and second frame images F1-F1 and third and fourth frame images F2-F2. This image conversion method may be called to 2-2 pull down method.

Referring to FIG. 6, the source image data may have a frame rate of 24 Hz and the input image data of the display apparatus may have a frame rate of 60 Hz. The frame rate of the display apparatus is 60 Hz so that a host may convert the frame rate of the source image data of 24 Hz to 60 Hz to provide the input image data having the frame rate of 60 Hz to the driving controller 200 of the display apparatus. To this end, odd numbered frame images of the source image data may be copied to form two consecutive identical frame images and even numbered frame images of the source image data may be copied to form three consecutive identical frame images. For example, a first frame image F1 of the source image data is copied by two and a second frame image F2 of the source image data is copied by three to form first and second frame images F1-F1 and third, fourth and fifth frame images F2-F2-F2. This image conversion method may be called to 2-3 pull down method.

Figure 7:
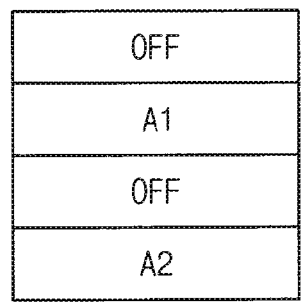
FIG. 7 is a conceptual diagram illustrating an example of a display panel of FIG. 1 including four areas.
Figure 8:
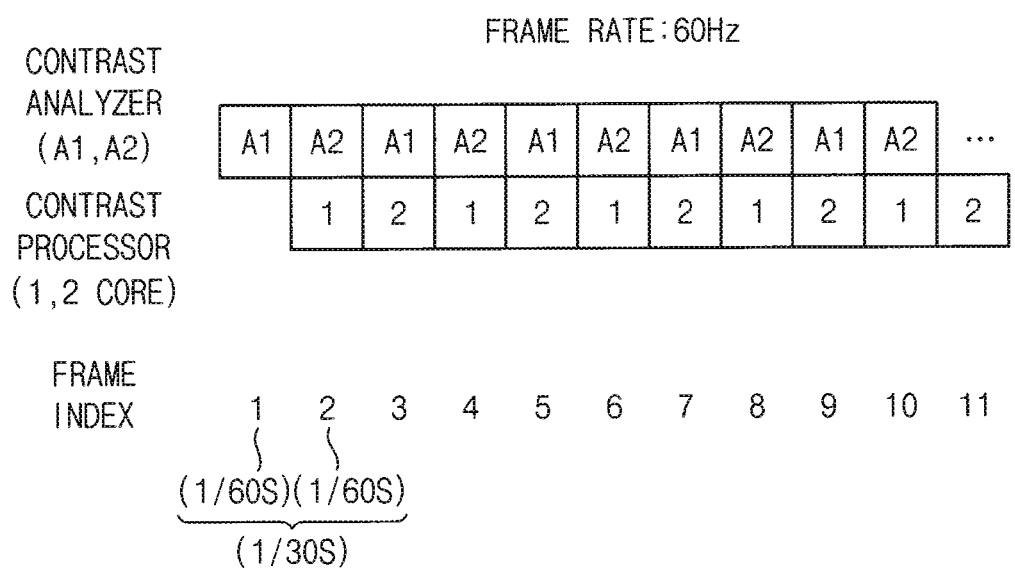
FIG. 8 is a conceptual diagram illustrating a contrast analyzer and a contrast processor for the display panel of FIG. 7.
Figure 9:
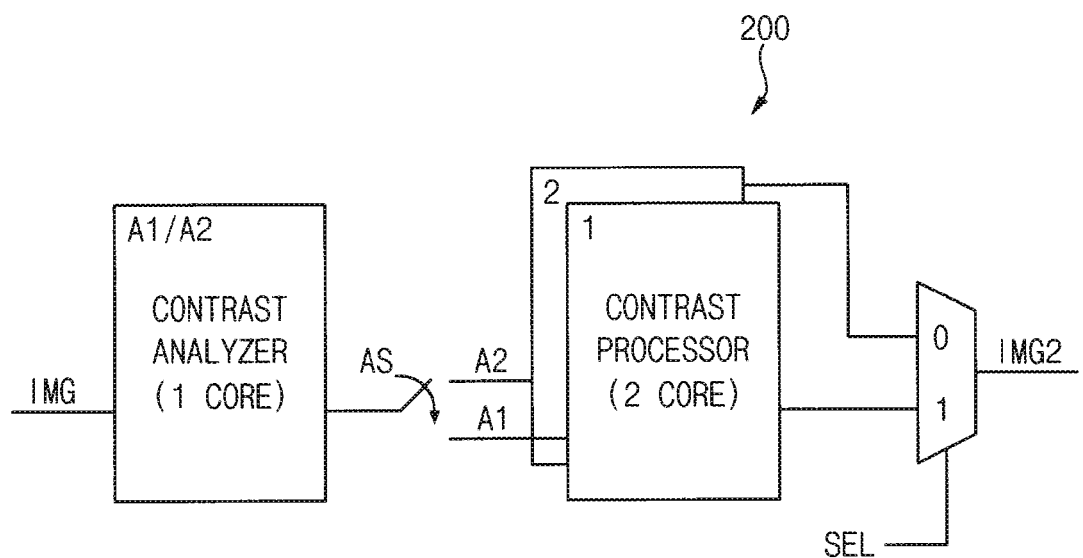
FIG. 9 is a block diagram illustrating the contrast analyzer and the contrast processor for the display panel of FIG. 7.

FIG. 7 is a conceptual diagram illustrating an example of the display panel 100 of FIG. 1 that includes four areas. The four areas includes two sub display areas A1 and A2, and two are sub off areas OFF and OFF. FIG. 8 is a conceptual diagram illustrating the contrast analyzer 220 and the contrast processor 240 for the display panel 100 of FIG. 7. FIG. 9 is a block diagram illustrating the contrast analyzer 220 and the contrast processor 240 for the display panel 100 of FIG. 7.

Referring to FIGS. 1 to 9, in the present embodiment, the display panel 100 may include four areas OFF, A1, OFF and A2. Two of the four areas are sub display areas A1 and A2 having the input image data IMG and the other two of the four areas are sub off areas OFF and OFF not having the input image data IMG. In the present embodiment, the frame rate may be 60 Hz.

In FIG. 7, the two sub off areas may mean areas that do not display an image to a user according to the specific structures of the display apparatus (e.g., the foldable display apparatus, the rollable display apparatus, the bended display apparatus, the curved display apparatus and the slide display apparatus).

In addition, the positions of the four areas OFF, A1, OFF and A2 may be switched, the positions of the boundary between the four areas OFF, A1, OFF and A2 may be moved, or the sizes of the four areas OFF, A1, OFF and A2 may be changed according to a structural change of the display apparatus (e.g., the foldable display apparatus, the rollable display apparatus, the bended display apparatus, the curved display apparatus and the slide display apparatus). FIG. 7 means that the display panel 100 includes two sub display areas A1 and A2, and accordingly, the input image data IMG includes sub input image data corresponding to the first sub display area A1 and sub input image data corresponding to the second sub display area A2.

The contrast analyzer 220 may include a single contrast analysis core or a plurality of contrast analysis cores. The contrast processor 240 may include a plurality of contrast processor cores.

The contrast analysis core means a unit module of analyzing the contrast of the input image data IMG. When the driving controller 200 is an IC chip, each of the contrast analysis cores may be included in the IC chip.

The contrast processor core means a unit module of adjusting the contrast of the input image data IMG based on the analysis result of the contrast analyzer 220. When the driving controller 200 is an IC chip, each of the contrast processor cores may be included in the IC chip.

In the present embodiment, the number of the contrast analysis cores of the contrast analyzer 220 may be determined according to the number of the sub display areas and the frame rate.

As the number of the sub display areas increases, the number of the contrast analysis cores may be increased. As the frame rate increases, the number of the contrast analysis cores may be decreased. As shown in FIGS. 5 and 6, although the frame rate of the input image data IMG is 50 Hz or 60 Hz, the frame rate of the source image data may be 25 Hz or 24 Hz which is lower than the frame rate of the input image data IMG. Thus, even if the contrast analyzer 220 is operated in a time division method and the number of the contrast analysis cores of the contrast analyzer 220 is reduced, the display quality of the display apparatus may not be affected. In addition, changes of the image in 1/30 second may not be well recognized to eyes of a user. As a result, even if a cycle of the contrast analysis of the contrast analyzer 220 is reduced to 1/30 second, the display quality of the display apparatus may not be affected.

In the present embodiment, the number of the contrast processor cores of the contrast processor 240 may be set to be equal to the number of the sub display areas. The number of the contrast analysis cores may be less than the number of the contrast processor cores.

In the present embodiment, the number of the sub display areas A1 and A2 may be two and the frame rate may be 60 Hz. The number of the contrast analysis core may be one and the number of the contrast processor cores may be two.

In FIG. 8, the contrast analysis core may analyze the input image data of A1 sub display area in a first frame and may analyze the input image data of A2 sub display area in a second frame. The contrast analysis core may analyze the input image data of the A1 sub display area in a third frame and may analyze the input image data of the A2 sub display area in a fourth frame.

The cycle in which the contrast analysis core analyzes the input image data of the A1 sub display area may be 1/30 second. The contrast analysis core may divide the input image data provided at the frame rate of 60 Hz by ½ to operate the time division method.

The driving controller 200 may further include a switch AS connecting the contrast analysis core to the plurality of the contrast processor cores. (see FIG. 9.) In the present embodiment, the switch AS may selectively connect the contrast analysis core to two contrast processor cores. In a second frame, the switch AS is connected to a first contrast processor core so that the contrast analysis core outputs an analysis result of the input image data of the A1 sub display area in a first frame to the first contrast processor core. In a third frame, the switch AS is connected to a second contrast processor core so that the contrast analysis core outputs an analysis result of the input image data of the A2 sub display area in the second frame to the second contrast processor core.

The driving controller 200 may further include a multiplexer selectively outputting one of the outputs of the contrast processor cores. In the present embodiment, the multiplexer may output one of the output of the first contrast processor core and the output of the second contrast processor core as the output image data IMG2 in response to an output selection signal SEL.

Figure 10:
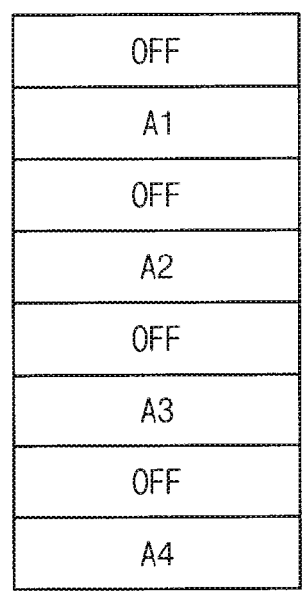
FIG. 10 is a conceptual diagram illustrating an example of a display panel of FIG. 1 including eight areas.
Figure 11:
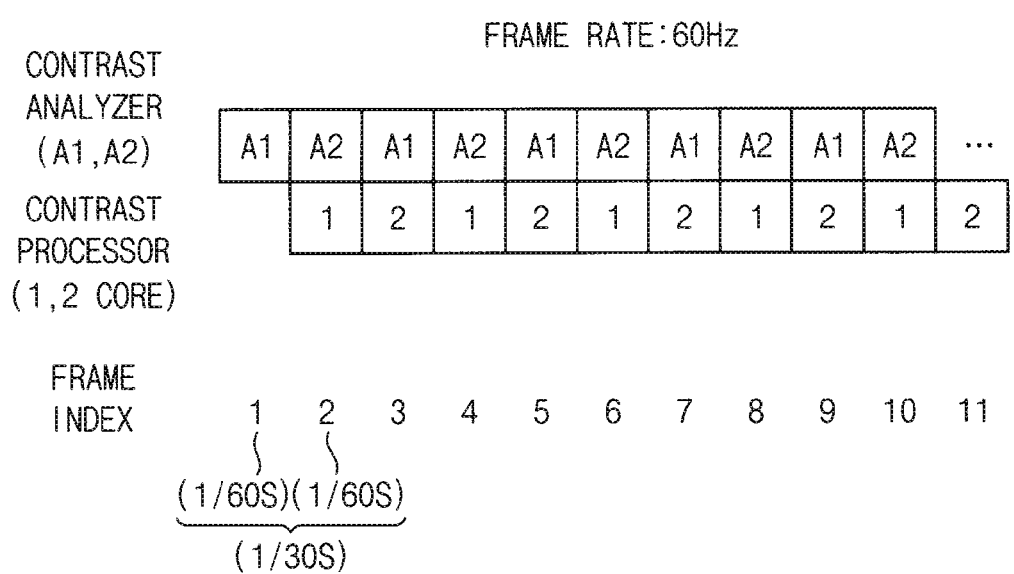
FIGS. 11 and 12 are conceptual diagrams illustrating a contrast analyzer and a contrast processor for the display panel of FIG. 10.
Figure 12:
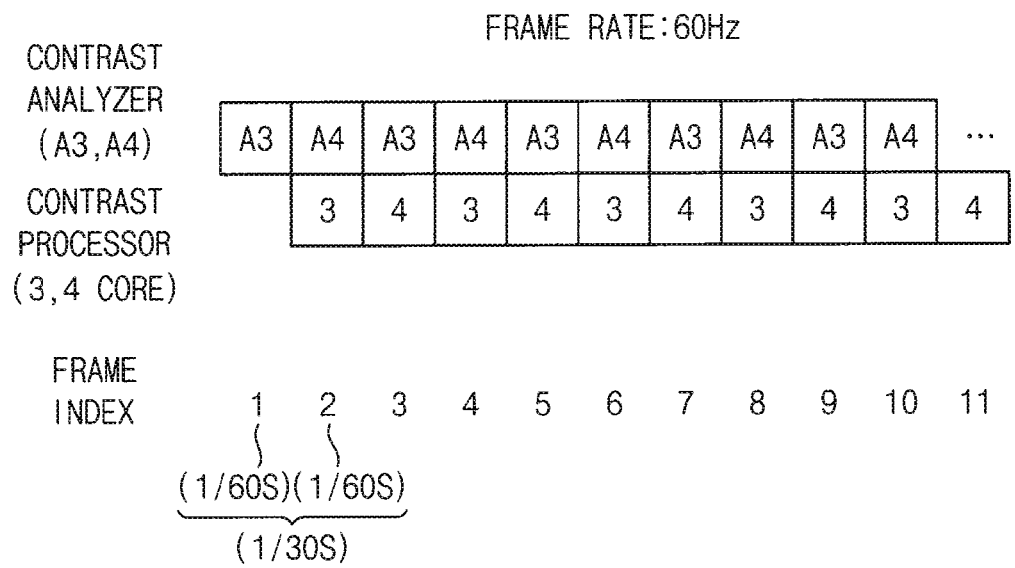
Figure 13:
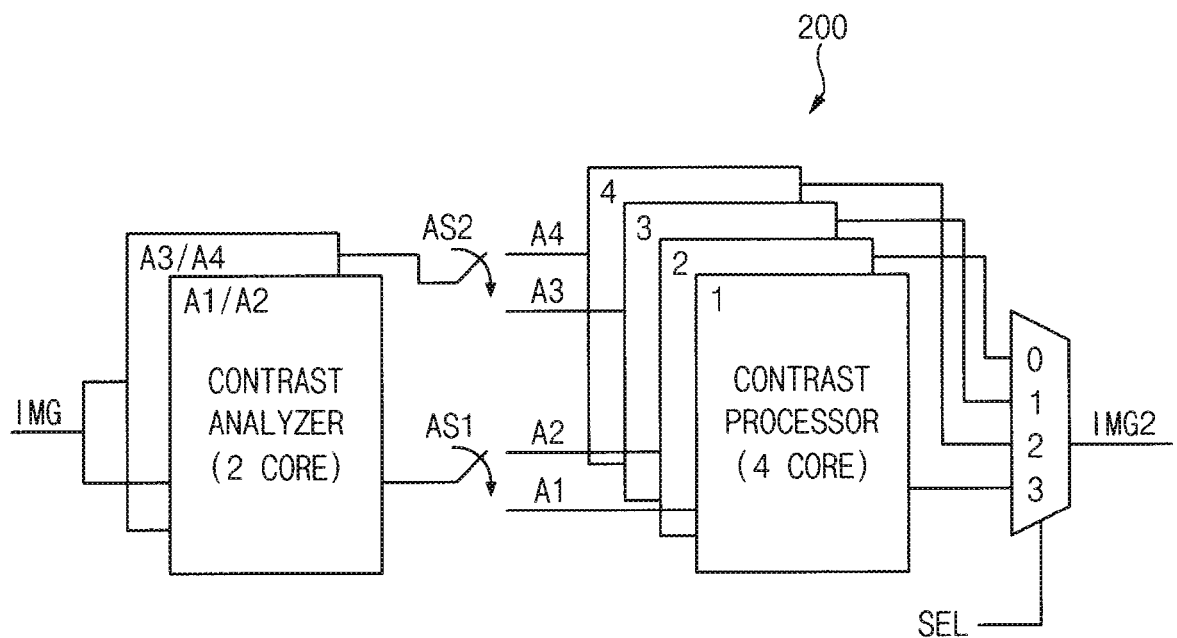
FIG. 13 is a block diagram illustrating the contrast analyzer and the contrast processor for the display panel of FIG. 10.

FIG. 10 is a conceptual diagram illustrating an example of the display panel 100 of FIG. 1 that includes eight areas. The eight areas include four sub display areas A1, A2, A3 and A4, and four sub off areas OFF, OFF, OFF and OFF. FIGS. 11 and 12 are conceptual diagrams illustrating the contrast analyzer 220 and the contrast processor 240 for the display panel 100 of FIG. 10. FIG. 13 is a block diagram illustrating the contrast analyzer 220 and the contrast processor 240 for the display panel 100 of FIG. 10.

Referring to FIGS. 1 to 6 and 10 to 13, in the present embodiment, the display panel 100 may include eight areas OFF, A1, OFF, A2, OFF, A3, OFF and A4. Four of the eight areas are sub display areas A1, A2, A3 and A4 having the input image data IMG and the other four of the eight areas are sub off areas OFF, OFF, OFF and OFF not having the input image data IMG. In the present embodiment, the frame rate may be 60 Hz.

In the present embodiment, the number of the sub display areas A1, A2, A3 and A4 may be four and the frame rate may be 60 Hz. The number of the contrast analysis cores may be two and the number of the contrast processor cores may be four.

In FIG. 11, a first contrast analysis core may analyze the input image data of A1 sub display area in a first frame and may analyze the input image data of A2 sub display area in a second frame. The first contrast analysis core may analyze the input image data of the A1 sub display area in a third frame and may analyze the input image data of the A2 sub display area in a fourth frame.

The cycle in which the first contrast analysis core analyzes the input image data of the A1 sub display area may be 1/30 second. The first contrast analysis core may divide the input image data provided at the frame rate of 60 Hz by ½ to operate the time division method.

In FIG. 12, a second contrast analysis core may analyze the input image data of A3 sub display area in the first frame and may analyze the input image data of A4 sub display area in the second frame. The second contrast analysis core may analyze the input image data of the A3 sub display area in the third frame and may analyze the input image data of the A4 sub display area in the fourth frame.

The cycle in which the second contrast analysis core analyzes the input image data of the A3 sub display area may be 1/30 second. The second contrast analysis core may divide the input image data provided at the frame rate of 60 Hz by ½ to operate the time division method.

The driving controller 200 may further include switches AS1 and AS2 connecting the contrast analysis core to the plurality of the contrast processor cores. In the present embodiment, a first switch AS1 may selectively connect the first contrast analysis core to first and second contrast processor cores and a second switch AS2 may selectively connect the second contrast analysis core to third and fourth contrast processor cores.

The driving controller 200 may further include a multiplexer selectively outputting one of the outputs of the contrast processor cores. In the present embodiment, the multiplexer may output one of the outputs of the first to fourth contrast processor cores as the output image data IMG2 in response to an output selection signal SEL.

Figure 14:
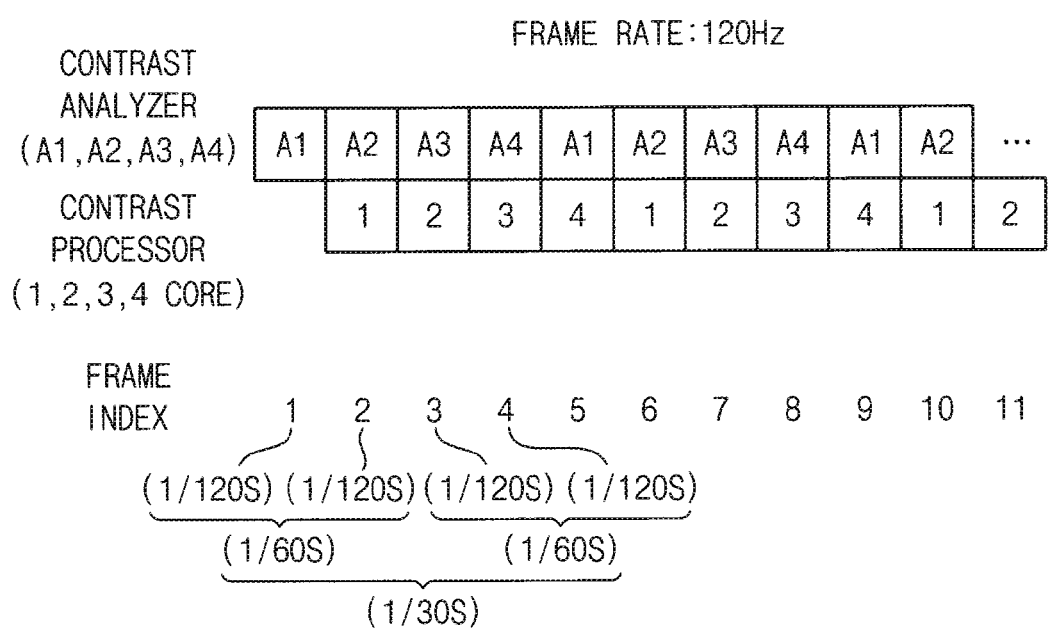
FIG. 14 is a conceptual diagram illustrating a contrast analyzer and a contrast processor for the display panel of FIG. 10.
Figure 15:
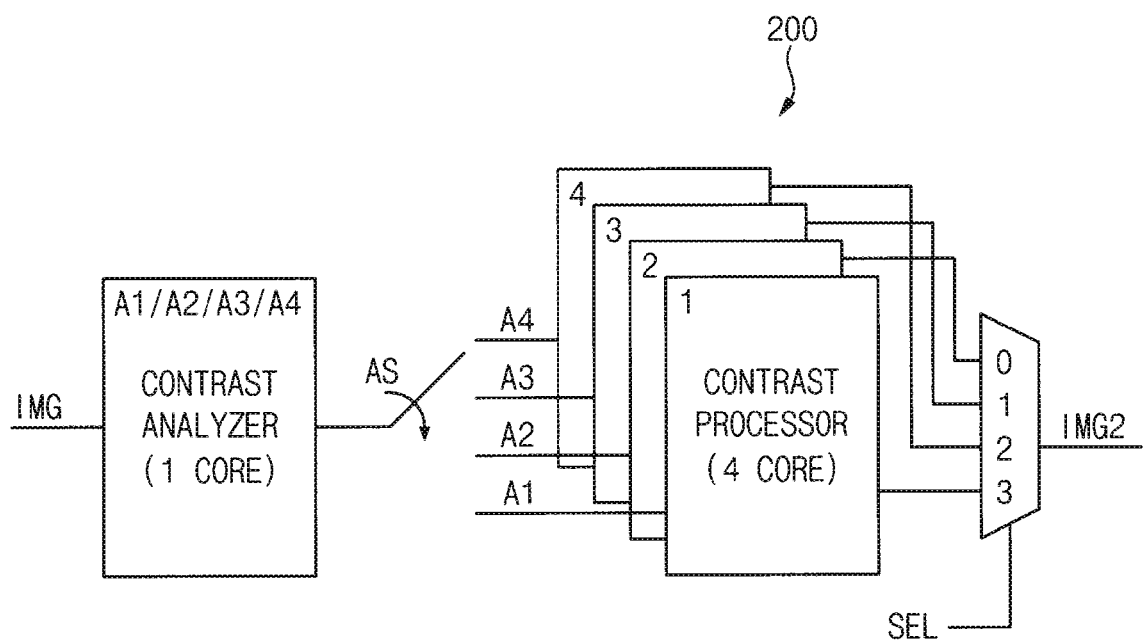
FIG. 15 is a block diagram illustrating the contrast analyzer and the contrast processor for the display panel of FIG. 10.

FIG. 14 is a conceptual diagram illustrating the contrast analyzer 220 and the contrast processor 240 for the display panel 100 of FIG. 10. FIG. 15 is a block diagram illustrating the contrast analyzer 220 and the contrast processor 240 for the display panel 100 of FIG. 10.

Referring to FIGS. 1 to 6, 14 and 15, in the present embodiment, the display panel 100 may include eight areas OFF, A1, OFF, A2, OFF, A3, OFF and A4. Four of the eight areas are sub display areas A1, A2, A3 and A4 having the input image data IMG and the other four of the eight areas are sub off areas OFF, OFF, OFF and OFF not having the input image data IMG. In the present embodiment, the frame rate may be 120 Hz.

In the present embodiment, the number of the sub display areas A1, A2, A3 and A4 may be four and the frame rate may be 120 Hz. The number of the contrast analysis core may be one and the number of the contrast processor cores may be four.

In FIG. 14, a contrast analysis core may analyze the input image data of A1 sub display area in a first frame and may analyze the input image data of A2 sub display area in a second frame. The contrast analysis core may analyze the input image data of A3 sub display area in a third frame and may analyze the input image data of A4 sub display area in a fourth frame.

The cycle in which the contrast analysis core analyzes the input image data of the A1 sub display area may be 1/30 second. The contrast analysis core may divide the input image data provided at the frame rate of 120 Hz by 1/4 to operate the time division method.

The driving controller 200 may further include a switch AS connecting the contrast analysis core to the plurality of the contrast processor cores. In the present embodiment, the switch may selectively connect the contrast analysis core to first, second, third and fourth contrast processor cores.

The driving controller 200 may further include a multiplexer selectively outputting one of the outputs of the contrast processor cores. In the present embodiment, the multiplexer may output one of the outputs of the first to fourth contrast processor cores as the output image data IMG2 in response to an output selection signal SEL.

Figure 16:
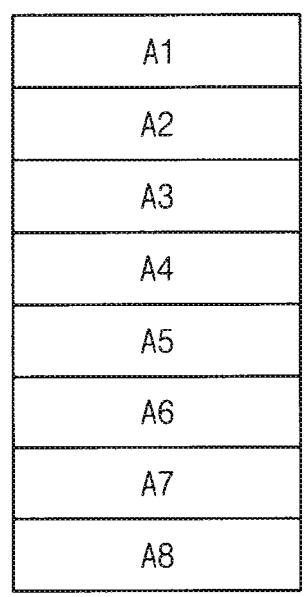
FIG. 16 is a conceptual diagram illustrating an example of a display panel of FIG. 1 including eight areas.
Figure 19:
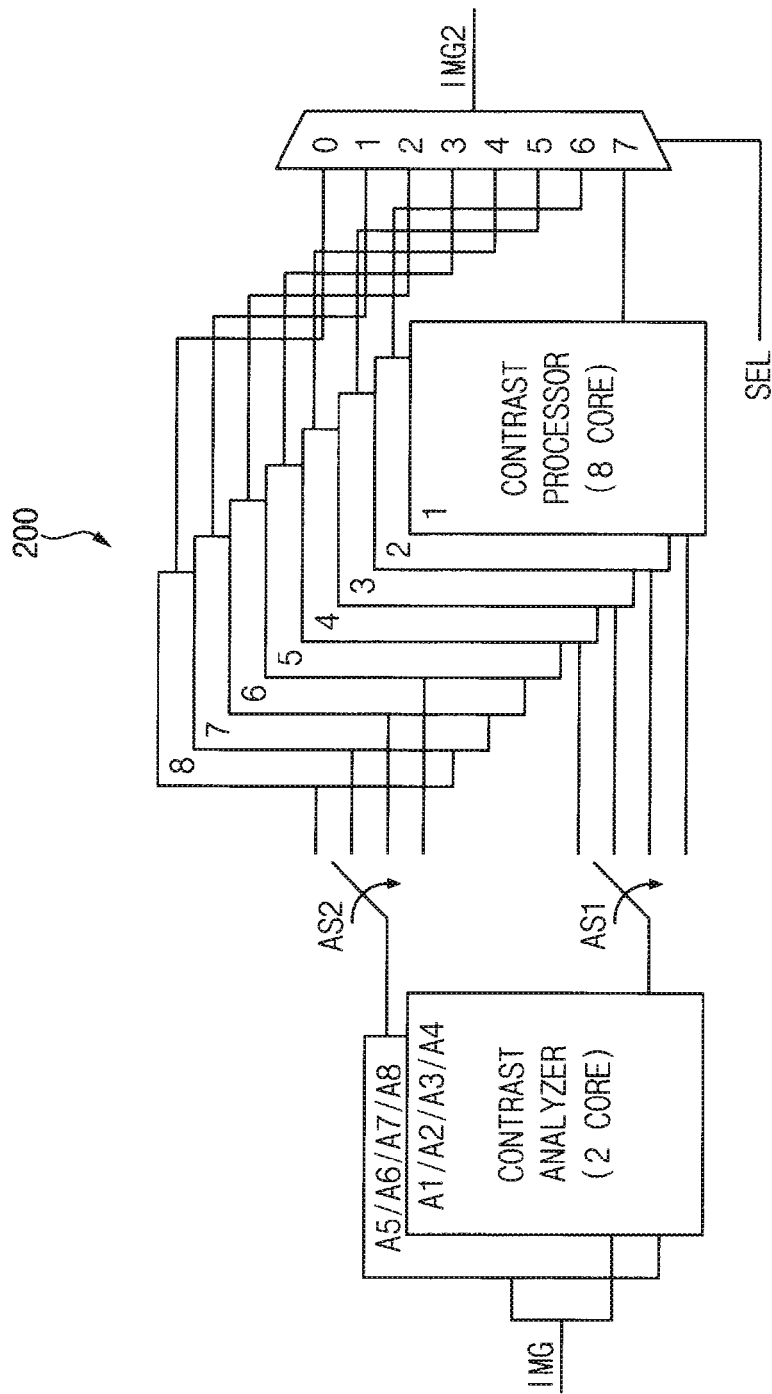
FIG. 19 is a block diagram illustrating the contrast analyzer and the contrast processor for the display panel of FIG. 16.

FIG. 16 is a conceptual diagram illustrating an example of the display panel 100 of FIG. 1 including eight sub display areas. FIGS. 17 and 18 are conceptual diagrams illustrating the contrast analyzer 220 and the contrast processor 240 for the display panel 100 of FIG. 16. FIG. 19 is a block diagram illustrating the contrast analyzer 220 and the contrast processor 240 for the display panel 100 of FIG. 16.

Referring to FIGS. 1 to 6 and 16 to 19, in the present embodiment, the display panel 100 may include eight areas A1, A2, A3, A4, A5, A6, A7 and A8. All of the eight areas are sub display areas A1, A2, A3, A4, A5, A6, A7 and A8 having the input image data IMG. In the present embodiment, the frame rate may be 120 Hz.

In the present embodiment, the number of the sub display areas A1, A2, A3, A4, A5, A6, A7 and A8 may be eight and the frame rate may be 120 Hz. The number of the contrast analysis cores may be two and the number of the contrast processor cores may be eight.

In FIG. 17, a first contrast analysis core may analyze the input image data of A1 sub display area in a first frame and may analyze the input image data of A2 sub display area in a second frame. The first contrast analysis core may analyze the input image data of A3 sub display area in a third frame and may analyze the input image data of A4 sub display area in a fourth frame.

The cycle in which the first contrast analysis core analyzes the input image data of the A1 sub display area may be 1/30 second. The first contrast analysis core may divide the input image data provided at the frame rate of 120 Hz by 1/4 to operate the time division method.

In FIG. 18, a second contrast analysis core may analyze the input image data of A5 sub display area in the first frame and may analyze the input image data of A6 sub display area in the second frame. The second contrast analysis core may analyze the input image data of A7 sub display area in the third frame and may analyze the input image data of A8 sub display area in the fourth frame.

The cycle in which the second contrast analysis core analyzes the input image data of the A5 sub display area may be 1/30 second. The second contrast analysis core may divide the input image data provided at the frame rate of 120 Hz by 1/4 to operate the time division method.

The driving controller 200 may further include switches AS1 and AS2 connecting the contrast analysis core to the plurality of the contrast processor cores. In the present embodiment, a first switch AS1 may selectively connect the first contrast analysis core to first, second, third and fourth contrast processor cores and a second switch AS2 may selectively connect the second contrast analysis core to fifth, sixth, seventh and eight contrast processor cores.

The driving controller 200 may further include a multiplexer selectively outputting one of the outputs of the contrast processor cores. In the present embodiment, the multiplexer may output one of the outputs of the first to eighth contrast processor cores as the output image data IMG2 in response to an output selection signal SEL.

Figure 20:
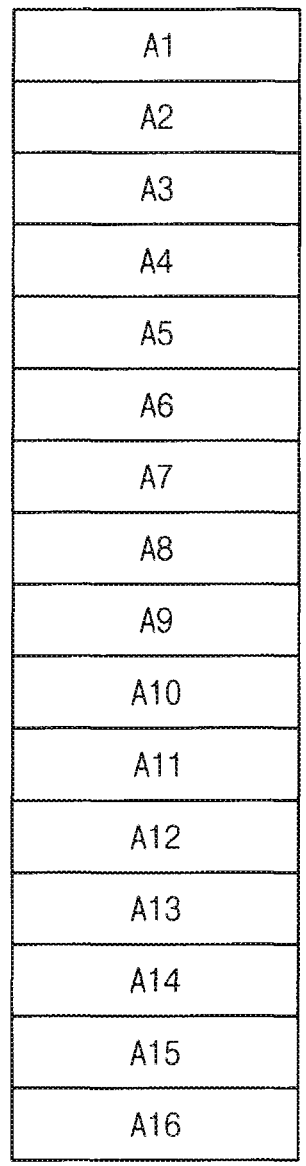
FIG. 20 is a conceptual diagram illustrating an example of a display panel of FIG. 1 including sixteen areas.
Figure 21:
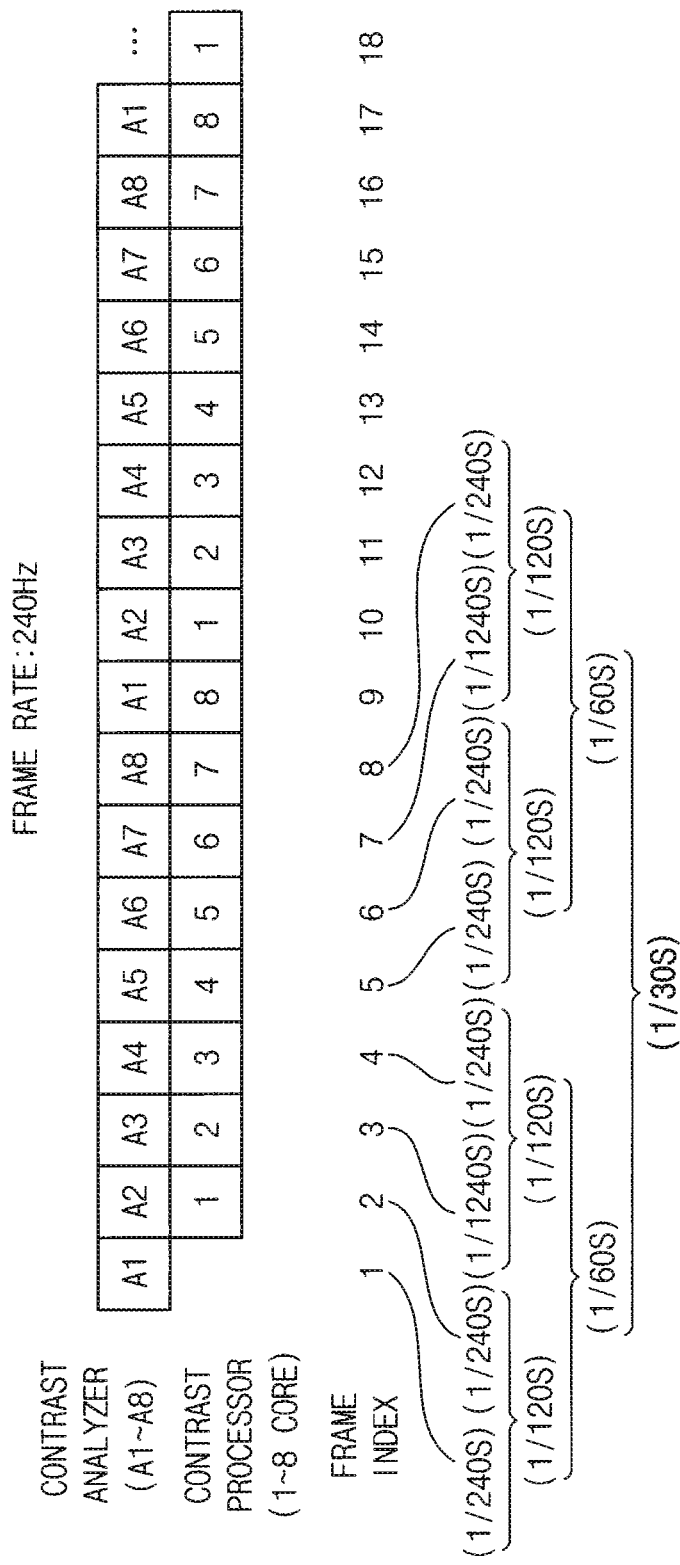
FIGS. 21 and 22 are conceptual diagrams illustrating a contrast analyzer and a contrast processor for the display panel of FIG. 20.
Figure 22:
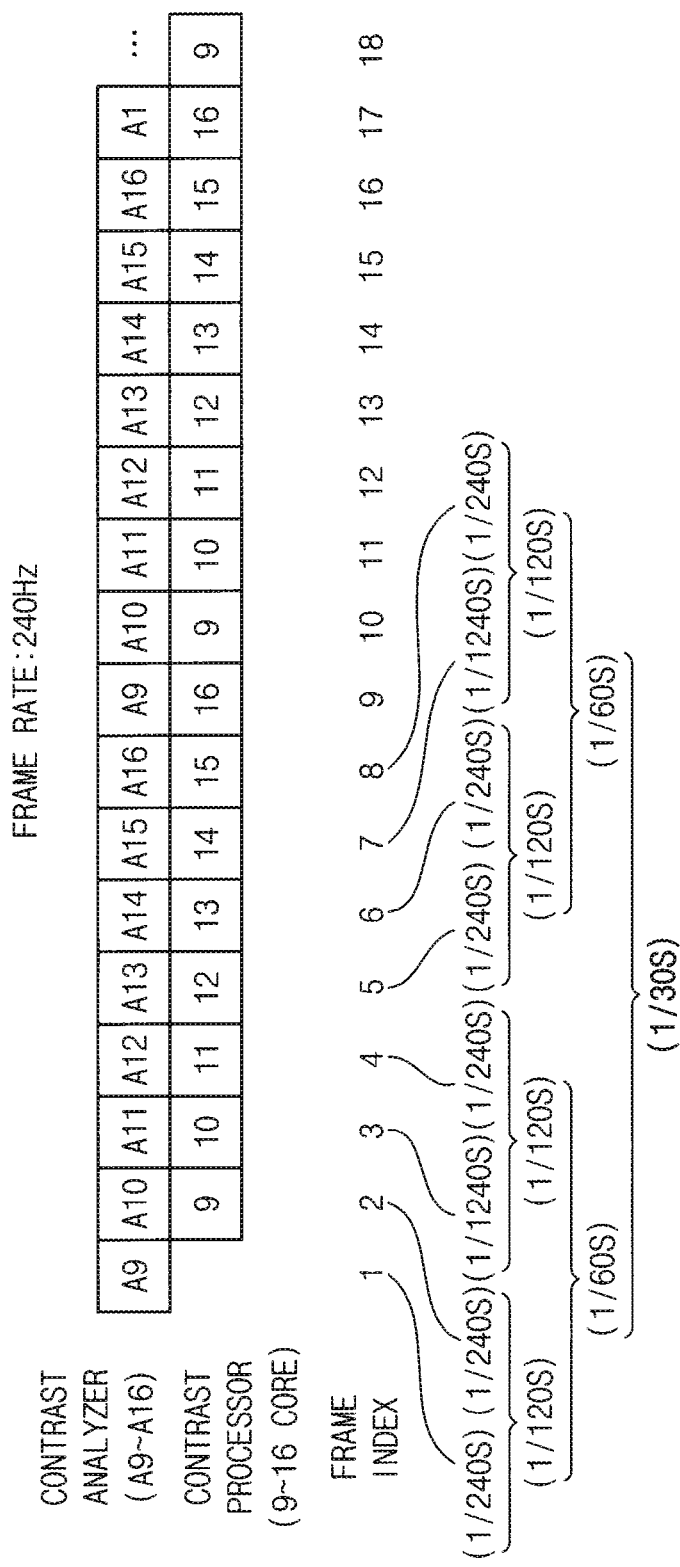

FIG. 20 is a conceptual diagram illustrating an example of the display panel 100 of FIG. 1 that include sixteen areas. The sixteen areas include sixteen display areas A1, A2, A3, A4, A5, A6, A7, A8, A9, A10, A11, A12, A13, A14, A15 and A16. FIGS. 21 and 22 are conceptual diagrams illustrating the contrast analyzer 220 and the contrast processor 240 for the display panel 100 of FIG. 20.

Referring to FIGS. 1 to 6 and 20 to 22, in the present embodiment, the display panel 100 may include sixteen areas A1, A2, A3, A4, A5, A6, A7, A8, A9, A10, A11, A12, A13, A14, A15 and A16. All of the sixteen areas are sub display areas A1, A2, A3, A4, A5, A6, A7, A8, A9, A10, A11, A12, A13, A14, A15 and A16 having the input image data IMG. In the present embodiment, the frame rate may be 240 Hz.

In the present embodiment, the number of the sub display areas A1, A2, A3, A4, A5, A6, A7, A8, A9, A10, A11, A12, A13, A14, A15 and A16 may be sixteen and the frame rate may be 240 Hz. The number of the contrast analysis cores may be two and the number of the contrast processor cores may be sixteen.

In FIG. 21, a first contrast analysis core may analyze the input image data of A1 sub display area in a first frame and may analyze the input image data of A2 sub display area in a second frame. The first contrast analysis core may analyze the input image data of A3 sub display area in a third frame and may analyze the input image data of A4 sub display area in a fourth frame. The first contrast analysis core may analyze the input image data of A5 sub display area in a fifth frame and may analyze the input image data of A6 sub display area in a sixth frame. The first contrast analysis core may analyze the input image data of A7 sub display area in a seventh frame and may analyze the input image data of A8 sub display area in an eighth frame.

The cycle in which the first contrast analysis core analyzes the input image data of the A1 sub display area may be 1/30 second. The first contrast analysis core may divide the input image data provided at the frame rate of 240 Hz by 1/8 to operate the time division method.

In FIG. 22, a second contrast analysis core may analyze the input image data of A9 sub display area in the first frame and may analyze the input image data of A10 sub display area in the second frame. The second contrast analysis core may analyze the input image data of A11 sub display area in the third frame and may analyze the input image data of A12 sub display area in the fourth frame. The second contrast analysis core may analyze the input image data of A13 sub display area in the fifth frame and may analyze the input image data of A14 sub display area in the sixth frame. The second contrast analysis core may analyze the input image data of A15 sub display area in the seventh frame and may analyze the input image data of A16 sub display area in the eighth frame.

The cycle in which the second contrast analysis core analyzes the input image data of the A9 sub display area may be 1/30 second. The second contrast analysis core may divide the input image data provided at the frame rate of 240 Hz by 1/8 to operate the time division method.

FIG. 23 is a table illustrating the number of contrast analysis cores according to the number of the sub display areas of the display panel 100 of FIG. 1 and the frame rate.

In FIG. 23, the number of the sub display areas is varied but the frame rate is fixed to 60 Hz. It may be appropriate to set the analysis cycle of the contrast analysis core to 1/30 second so that the contrast analysis core may operate a 1/2 time division operation when the frame rate is 60 Hz. In this case, for example, the number of the contrast analysis cores may be a half of the number of the sub display areas.

When the number of the sub display areas is two and the frame rate is 60 Hz, the number of the contrast analysis core is one. The number of the contrast processor cores may be two which is equal to the number of the sub display areas.

When the number of the sub display areas is four and the frame rate is 60 Hz, the number of the contrast analysis core is two. The number of the contrast processor cores may be four which is equal to the number of the sub display areas.

When the number of the sub display areas is eight and the frame rate is 60 Hz, the number of the contrast analysis core is four. The number of the contrast processor cores may be eight which is equal to the number of the sub display areas.

When the number of the sub display areas is sixteen and the frame rate is 60 Hz, the number of the contrast analysis core is eight. The number of the contrast processor cores may be sixteen which is equal to the number of the sub display areas.

FIG. 24 is a table illustrating the number of contrast analysis cores according to the number of the sub display areas of the display panel 100 of FIG. 1 and the frame rate.

In FIG. 24, the number of the sub display areas is varied and the frame rate is respectively set to 60 Hz, 60 Hz, 120 Hz and 240 Hz. It may be appropriate to set the analysis cycle of the contrast analysis core to 1/30 second so that the contrast analysis core may operate a 1/2 time division operation when the frame rate is 60 Hz. When the contrast analysis core operates the 1/2 time division operation, the number of the contrast analysis cores may be a half of the number of the sub display areas.

It may be appropriate to set the analysis cycle of the contrast analysis core to 1/30 second so that the contrast analysis core may operate a 1/4 time division operation when the frame rate is 120 Hz. When the contrast analysis core operates the 1/4 time division operation, the number of the contrast analysis cores may be a quarter of the number of the sub display areas.

It may be appropriate to set the analysis cycle of the contrast analysis core to 1/30 second so that the contrast analysis core may operate a 1/8 time division operation when the frame rate is 240 Hz. When the contrast analysis core operates the 1/8 time division operation, the number of the contrast analysis cores may be 1/8 of the number of the sub display areas.

When the number of the sub display areas is two and the frame rate is 60 Hz, the number of the contrast analysis core is one. The number of the contrast processor cores may be two which is equal to the number of the sub display areas.

When the number of the sub display areas is four and the frame rate is 60 Hz, the number of the contrast analysis core is two. The number of the contrast processor cores may be four which is equal to the number of the sub display areas.

When the number of the sub display areas is eight and the frame rate is 120 Hz, the number of the contrast analysis core is two. The number of the contrast processor cores may be eight which is equal to the number of the sub display areas.

When the number of the sub display areas is sixteen and the frame rate is 240 Hz, the number of the contrast analysis core is two. The number of the contrast processor cores may be sixteen which is equal to the number of the sub display areas.

According to the present embodiment, in the display apparatus including the display panel 100 including the plurality of sub display areas, the contrast analysis cores may be operated in a time division method so that the number of the contrast analysis cores may be reduced.

The number of the contrast analysis cores is reduced so that the size of the display panel driver may be reduced and the power consumption of the display apparatus may be reduced.

According to the display apparatus and the method of driving the display apparatus of the present inventive concept, the size of the display panel driver may be reduced and the power consumption of the display apparatus may be reduced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:
a display panel comprising a plurality of sub display areas and displaying an image based on input image data;
a contrast analyzer analyzing the input image data in a time division method in which the contrast analyzer analyzes the input image data only corresponding to one of the plurality of sub display areas during each frame;
a contrast processor adjusting contrast of the input image data based on analysis result of the contrast analyzer; and
a data driver generating data voltages based on output data of the contrast processor, wherein a number of contrast analysis cores of the contrast analyzer is determined according to a number of the sub display areas and a frame rate, and wherein as the number of the sub display areas increases, the number of the contrast analysis cores increases.

2. The display apparatus of claim 1, wherein as the frame rate increases, the number of the contrast analysis cores decreases.

3. The display apparatus of claim 1, wherein a number of contrast processor cores of the contrast processor is equal to the number of the sub display areas.

4. The display apparatus of claim 3, wherein the number of the contrast analysis cores is less than the number of the contrast processor cores.

5. The display apparatus of claim 4, further comprising a switch connecting one contrast analysis core to a plurality of the contrast processor cores.

6. The display apparatus of claim 5, further comprising a multiplexer selectively outputting one of outputs of the plurality of the contrast processor cores.

7. The display apparatus of claim 4, wherein when the number of the sub display areas is two and the frame rate is 60 Hz, the number of the contrast analysis core is one and the number of the contrast processor cores is two.

8. The display apparatus of claim 4, wherein when the number of the sub display areas is four and the frame rate is 60 Hz, the number of the contrast analysis cores is two and the number of the contrast processor cores is four.

9. The display apparatus of claim 4, wherein when the number of the sub display areas is four and the frame rate is 120 Hz, the number of the contrast analysis core is one and the number of the contrast processor cores is four.

10. The display apparatus of claim 4, wherein when the number of the sub display areas is eight and the frame rate is 120 Hz, the number of the contrast analysis cores is two and the number of the contrast processor cores is eight.

11. The display apparatus of claim 4, wherein when the number of the sub display areas is sixteen and the frame rate is 240 Hz, the number of the contrast analysis cores is two and the number of the contrast processor cores is sixteen.

12. The display apparatus of claim 1, wherein the contrast analyzer is converting first color coordinates of the input image data to second color coordinates to extract luminance components of the input image data, to generate a luminance histogram based on the luminance components of the input image data, to generate a low luminance group, a medium luminance group and a high luminance group based on the luminance histogram and to determine a first threshold value between the low luminance group and the medium luminance group and a second threshold value between the medium luminance group and the high luminance group.

13. The display apparatus of claim 12, wherein the first threshold value and the second threshold value are updated for the each frame.

14. The display apparatus of claim 12, wherein, when grayscale data included in the medium luminance group is greater than a reference value, the contrast processor is compensating the input image data to increase the contrast of the input image data, and wherein, when the grayscale data included in the medium luminance group is less than the reference value, the contrast processor is compensating the input image data to decrease the contrast of the input image data.

15. A method of driving a display apparatus, the method comprising:

analyzing input image data applied to a display panel that includes a plurality of sub display areas in a time division method, the time division method analyzing input image data only corresponding to one of the plurality of sub display areas during each frame;

adjusting contrast of the input image data based on an analysis result of the input image data; and generating data voltages based on image data having the adjusted contrast, wherein a number of contrast analysis cores which analyze the input image data is determined according to a number of the sub display areas and a frame rate, and wherein as the number of the sub display areas increases, the number of the contrast analysis cores increases.

16. The method of claim 15, wherein as the frame rate increases, the number of the contrast analysis cores decreases.

17. The method of claim 15, wherein the analyzing input image data comprises:

converting first color coordinates of the input image data to second color coordinates to extract luminance components of the input image data;

generating a luminance histogram based on the luminance components of the input image data;

generating a low luminance group, a medium luminance group and a high luminance group based on the luminance histogram; and determining a first threshold value between the low luminance group and the medium luminance group and a second threshold value between the medium luminance group and the high luminance group.

18. The method of claim 17, wherein when grayscale data included in the medium luminance group is greater than a reference value, the input image data are compensated to increase the contrast of the input image data, and wherein when the grayscale data included in the medium luminance group is less than the reference value, the input image data are compensated to decrease the contrast of the input image data.

* * * * *